United States Patent [19]

Machado Zuloaga et al.

[11] Patent Number: 6,030,434
[45] Date of Patent: Feb. 29, 2000

[54] METHOD FOR HOT AGGLOMERATION OF SOLID METALLIZED IRON PARTICLES TO PRODUCE ALLOYED BRIQUETTES

[75] Inventors: Henrique Machado Zuloaga, Lomas de los Chorros; Oscar G. Dam, Los Saltos, both of Venezuela

[73] Assignee: International Briquettes Holding, Caracas, Venezuela

[21] Appl. No.: 09/282,721

[22] Filed: Mar. 31, 1999

[51] Int. Cl.[7] .................................................. C22B 1/14

[52] U.S. Cl. ............................... 75/770; 75/316; 75/436; 419/1

[58] Field of Search .................... 419/1; 75/770, 75/436, 316

[56] References Cited

U.S. PATENT DOCUMENTS

| | | |
|---|---|---|
| 4,116,679 | 9/1978 | Pietsch . |
| 4,728,358 | 3/1988 | Hoffman et al. . |
| 4,731,112 | 3/1988 | Hoffman . |
| 5,698,009 | 12/1997 | Min et al. ................................ 75/436 |

*Primary Examiner*—Ngoclan Mai
*Attorney, Agent, or Firm*—Bachman & LaPointe, P.C.

[57] ABSTRACT

A method for making iron-alloy briquettes, includes the steps of: providing hot metallized iron particles having a temperature of at least about 650° C. and an initial degree of metallization of at least about 90% (wt.); providing an additive selected from the group consisting of ferroalloy powder, metal-containing ash and mixtures thereof, wherein the additive contains an alloying metal; mixing the iron particles and the additive to provide a mixture of the particles and the additive; and forming the mixture into briquettes containing the alloying metal.

21 Claims, 1 Drawing Sheet

METHOD FOR HOT AGGLOMERATION OF SOLID METALLIZED IRON PARTICLES TO PRODUCE ALLOYED BRIQUETTES

BACKGROUND OF THE INVENTION

The invention relates to a method for making hot briquetted iron, and, more specifically, to a method for hot agglomeration of solid metallized iron particles to produce alloyed briquettes.

Hot molded iron briquettes have been produced including a wide range of carbon, and such briquettes are useful as iron and steel making feedstock. Such briquettes are referred to commercially as hot briquetted iron or HBI. The hot briquetting technique is useful and has been used in order to reduce reoxidation and self-ignition of metallized iron oxides either in fines or pellets form, which advantageously allows for maritime transportation.

U.S. Pat. No. 5,698,009 is drawn to a method for agglomerating pre-reduced hot iron particles to produce hot pig iron. In this patent, a binding agent such as aluminum-containing metal powder is added to pre-reduced hot iron or particles before passing to a smelting furnace. The aim is to produce enough mechanical compressive strength in resulting solids to withstand the solid burden in a smelting furnace. The binder materials used have an adverse effect on energy utilization during this process, and can also adversely impact the quality of the metal being produced.

The need remains for a suitable method for hot briquetted iron in an efficient process which also provides high quality product.

In addition, steel making methods frequently require expensive alloy additives or metals so as to provide desired properties.

It is therefore the primary object of the present invention to provide a method for making iron-alloy briquettes in an efficient manner.

It is a further object of the present invention to provide a method for making iron-alloy briquettes which include desirable alloy metals useful in specific steel making methods.

It is a still further object of the present invention to provide a method for making iron-alloy briquettes wherein the final briquette product has a high degree of metallization.

Other objects and advantages of the present invention will appear hereinbelow.

SUMMARY OF THE INVENTION

The foregoing objects and advantages of the present invention have been readily attained.

According to the present invention, a method for making iron-alloy briquettes is provided, which method comprises the steps of: providing hot metallized iron particles having a temperature of at least about 650° C. and an initial degree of metallization of at least about 90% (wt.); providing an additive selected from the group consisting of ferroalloy powder, metal-containing ash and mixtures thereof wherein said additive contains an alloying metal; mixing said iron particles and said additive to provide a mixture of said particles and said additive; and forming said mixture into briquettes containing said alloying metal.

The powder additive preferably includes both ferroalloy powder and metal-containing ash. The most preferable ferroalloy powder is ferrosilicon, and it is preferred that the metal-containing ash contain one or more transition metal elements, most preferably vanadium oxide and nickel oxide. Such ash is a readily available waste product from various hydrocarbon combustion processes.

The method of the present invention advantageously provides for use of hydrocarbon combustion waste products, and utilization of heat in an efficient manner so as to provide high quality briquettes including desirable alloying metals while reducing energy consumption and cost of waste disposal.

BRIEF DESCRIPTION OF THE DRAWINGS

A detailed description of preferred embodiments of the invention follows, with reference to the attached drawings, wherein.

DETAILED DESCRIPTION

The invention relates to a method for making iron-alloy briquettes and, more specifically, to a method for hot agglomeration of solid metallized iron particles to produce alloyed briquettes.

Figure 1:
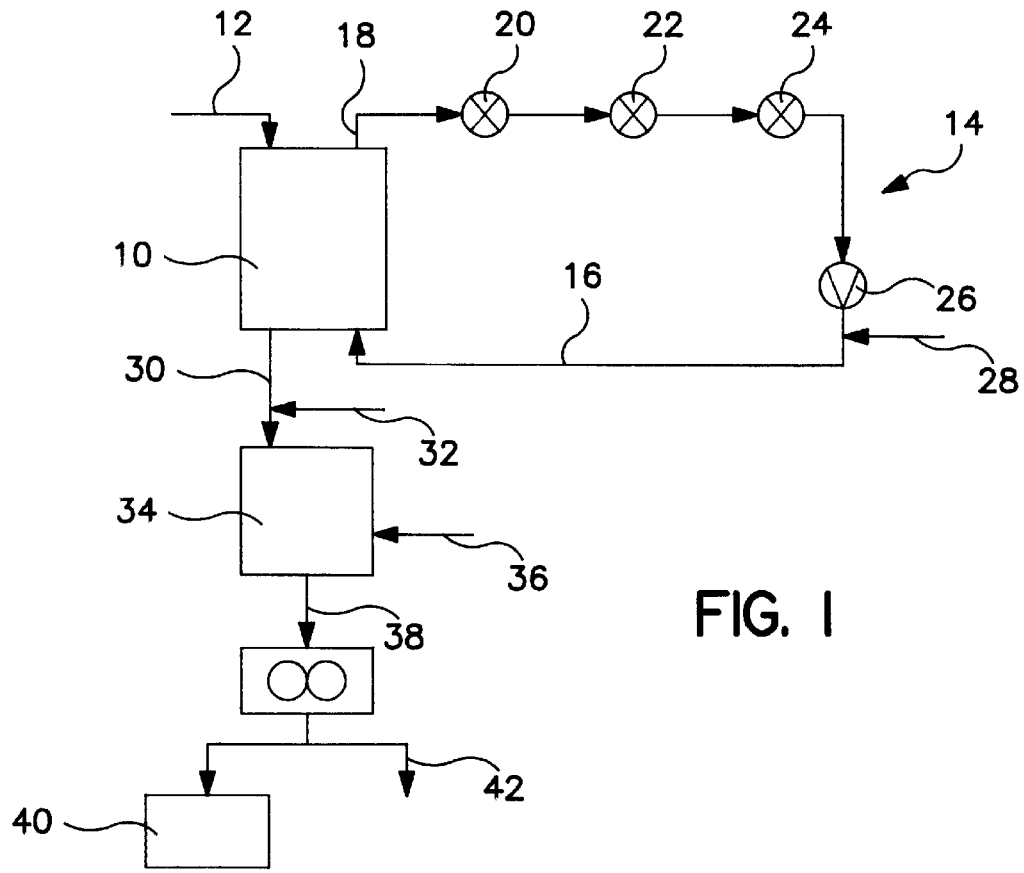
FIG. 1 is a schematic illustration of a method in accordance with the present invention.

FIG. 1 schematically illustrates a method in accordance with the present invention. In this method, particles of iron oxide are fed to a reducing vessel 10 through line 12. Reducing vessel 10 may be a reactor or vessel suitable for high pressure treatment of iron oxide fines, for example a bubbling bed reactor, a spouted bed reactor or a circulating fluidized bed reactor, or could be a reactor suitable for low pressure treatment of coarse or particulate iron oxide using a batch or shaft furnace. Reducing gas is circulated to reducing vessel 10 through a reducing gas loop 14 which includes a gas inlet line 16 and a gas exit line 18 which typically leads to a dust removal unit 20, a dewatering unit 22, and a carbon dioxide removal unit 24. Gas treated at units 20, 22, 24 is then fed through a compressor 26 and mixed with fresh reducing gas from line 28 as needed and recycled back through line 16 to reducing vessel 10. In reducing vessel 10, iron oxide reacts with the reducing gas so as to produce hot metallized iron particles exiting reactor 10 via line 30.

This hot metallized iron particulate product preferably has a degree of metallization of at least about 90% (wt), wherein the degree of metallization is defined as the percentage of metallic or reduced iron to total iron. This hot metallized iron particulate material will typically also contain about 2% (wt) carbon, and between about 1 and about 2% (wt) oxygen.

In accordance with the present invention, an additive is mixed with the hot metallized iron particulate material, for example through line 32, and is then fed preferably to a mixing vessel 34 where the powder additive serves to further reduce or metallize the hot metallized particles, and to introduce certain desirable alloying metals into the hot metallized iron particles, all during reactions which are exothermic and which, advantageously, provide additional heat for subsequent melting or other processes.

The additive is preferably mixed with the hot metallized iron particulate material at a temperature of at least about 650° C., preferably between about 700° C. and about 800° C., more preferably between about 740° C. and about 790° C.

In accordance with the present invention, the additive is preferably a particulate additive selected from the group consisting of ferroalloy powder, metal-containing ash and mixtures thereof. Most preferably, the additive will include both ferroalloy powder and metal-containing ash.

In accordance with the invention, the additive advantageously contains an alloying metal which, upon conclusion of the process, is incorporated into the final briquette product. This is desirable in that the briquettes can then be used in various steel making processes where the particular incorporated alloying metal is already present in the briquettes. In further accordance with the invention, the additive may also advantageously include reducing metal which advantageously reacts during the briquetting process with iron oxide remaining in the metallized iron particles so as to provide additional metallization and, accordingly, an increase in the degree of metallization of the resulting hot briquetted iron.

According to the invention, suitable ferroalloy powders include ferroalloys of iron with at least one element selected from the group consisting of chromium, nickel, vanadium, manganese, silicon, niobium and mixtures thereof. More preferably, the ferroalloy powder contains ferrosilicon, ferromanganese and mixtures thereof, and most preferably ferrosilicon. This is advantageous because, as discussed below, silicon acts as a reducing metal and reacts with remaining oxygen in the metallized iron to produce silica in an exothermic reaction. In addition to providing the desirable additional reduction or metallization of the iron particulate material, any one or more of the aforesaid metals included in the ferroalloy powder may also be a desirable alloying metal in the final product.

The metal-containing ash component of the powder additive is preferably a fly ash which may be produced as a waste or byproduct from various other processes such as solid or liquid hydrocarbon combustion processes. The ash component of the additive typically contains one or more metals which are desirable in the final briquette product as alloying metals for use in subsequent steel making processes. Examples of desirable alloying metals include titanium, cobalt, vanadium, chromium, niobium, manganese, nickel and any other desirable metal, particularly those which have hexagonal closed pack (HCP), body centered cubic (BCC) and face centered cubic (FCC) crystallographic characteristics. Such ash preferably includes transition-metals, typically present as oxides, and preferably vanadium oxide and nickel oxide. These metals may be useful as alloying metals and are therefore desirable and advantageously incorporated into the final briquette product. Suitable fly ash preferably contains between about 11% and about 48% (wt) vanadium oxide and between about 12 and about 44% (wt) nickel oxide, most preferably wherein the vanadium oxide is present as $V_2O_3$ or $V_2O_5$. The balance of such ash may typically consist of silica, iron oxide, alumina, carbon and other typical combustion products.

A particularly preferable additive includes ferrosilicon and fly ash containing the above-identified portions of nickel oxide and vanadium oxide.

Hot metallized iron particles and the powder additive are preferably mixed at a molar ratio of metallized iron to metals in the additive of between about 1 and about 3.

The additive is preferably a particulate material having particle sizes between about 5 and about 250 microns.

As will be further discussed below, the metal-containing ash can readily be obtained containing a desirable alloying metal, and this alloying metal following the method of the present invention is advantageously present in the final product so as to provide briquettes which are extremely useful in specific steel making procedures.

The hot metallized iron particles can suitably be provided as particles, fines, lumps or pellets, or in any other suitable form for treatment in reactor 10 as described above, and all such forms will be referred to herein collectively as particles.

In mixing vessel 34, the hot metallized iron particles and additive are preferably intimately mixed so as to obtain substantially homogeneous chemical and mechanical mixture of the elements, preferably while being subjected to a flow of hot inert gas such as pure nitrogen, which can be generated by combusting hydrocarbon or using any available gas from reduction loop 14. This gas is inert with respect to the process environment. The choice of suitable inert gas depends upon oxidation potential of the ferroalloy used in the powder additive and the carbon content in the metallized iron particles.

Inert gas may suitably be fed to mixing vessel 34 through line 36.

During the mixing step, the reducing metal portion of the additive serves to react with remaining iron oxide in the hot metallized iron particles so as to effect a further reduction or metallization of same. In addition, the alloying metals component of the additive are also reduced and incorporated into the final product so that the final product exhibits a higher degree of metallized iron, and includes reduced alloying metal elements and removable oxides such as carbon monoxide, carbon dioxide and silica.

The aforesaid reactions are exothermic so as to generate excess heat which, at this stage in the process, can advantageously be used to reduce energy consumption required for subsequent melting processes and the like. In addition, the increase in metallic iron content of the product is desirable and provides for a higher quality final product.

From mixing vessel 34, the hot solid mixture of at least partially reacted hot metallized iron particles and powder additive are fed through line 38 to a briquetting machine, typically at a temperature of between about 650° C. and about 740° C., more preferably between about 670° C. and 720° C., so as to produce the desired hot alloyed briquettes containing desired amounts of alloy elements, and such hot briquettes can either be discharged to a cooling circuit 40 as schematically shown in FIG. 1, or hot discharged via line 42 to a smelting or melting furnace.

The hot briquettes manufactured in accordance with the method of the present invention can be tailored to contain a wide variety of metals or combination of metals or other alloy additives depending upon the end use of the briquettes. For example, briquettes can be prepared containing specified amounts of nickel and chromium as alloying metals so as to provide a final briquette product which would be useful in making stainless steel. Alternatively, briquettes can be manufactured containing specified amounts of vanadium and manganese as alloying metals which would be useful for subsequent preparation of high strength low alloy or carbon steels. Of course, a wide variety of other types of briquettes useful for other specific types of steel making are also available.

Figure 2:
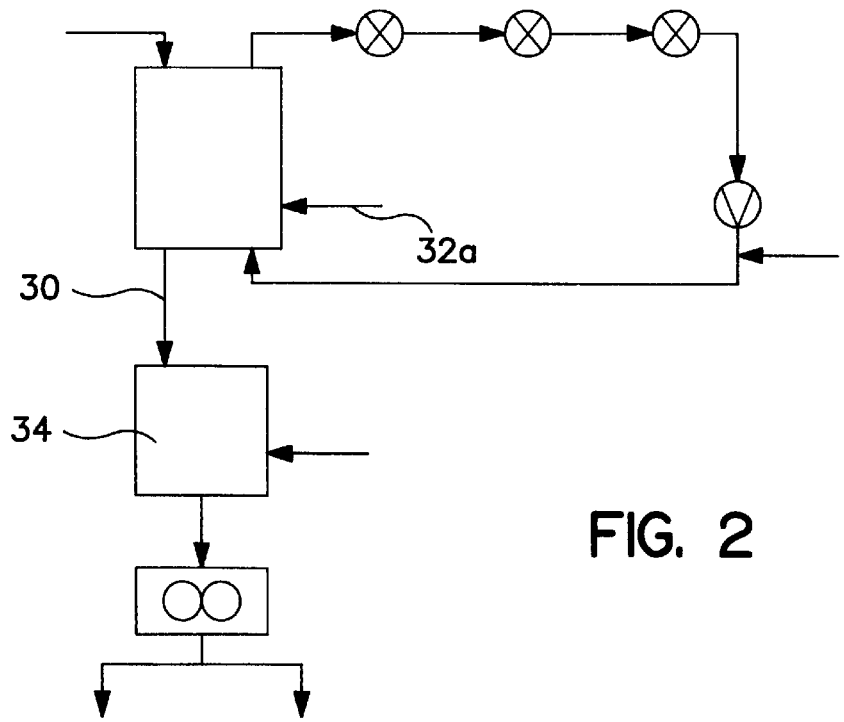
FIG. 2 schematically illustrates an alternative embodiment of the present invention.

Referring to FIG. 2, an alternative embodiment of the present invention is illustrated. FIG. 2 is substantially identical to FIG. 1, with the exception that additive is mixed with hot metallized iron particles through line 32a within reducing vessel 10. The mixture exiting line 30 passes to mixing chamber 34 so as to provide the desired reactor material for forming briquettes as described above. Thus, in the embodiment of FIG. 2, particulate additive is added within reducing vessel 10 within the scope of the present invention. It should be noted, however, that it is preferred to introduce the particulate additive of the present invention to metallized iron particulate material after reducing vessel 10 as shown in FIG. 1.

One particularly advantageous embodiment of the present invention is the use of a particulate or powder additive containing ferrosilicon powder and ash containing vanadium and nickel oxides. Mixing of such a powder additive with metallized iron particles will result in the following exothermic reactions which will take place either during the briquetting procedure or during the preheating stage at temperatures between the working temperature ranges and about 850° C. before total melting occurs. The reactions are as follows.

$2\ FeO+FeSi=3Fe+SiO_2$ $FeO+C=Fe+CO$ $2\ NiO+FeSi=Fe+2\ Ni+SiO_2$ $2\ V_2O_3+FeSi=3\ Fe+4\ V+3\ SiO_2$

Similar reactions can also take place for mixtures of nickel oxide and ferromanganese, ferrosilicon and ferroaluminum powder. The nickel and vanadium react in solid state with metallic iron to form iron alloys for the melting step during steel making processes. Silicon reacts with iron oxide to form silica and reduced iron, and excess heat resulting from silica formation also contributes to reduce energy consumption required for the melting process.

EXAMPLE

In this example, reducing reactions were carried out in a reducing vessel so as to provide a hot metallized iron particulate material having a degree of metallization of 92–93% (wt). This material contained about 1.5–1.8% (wt) carbon, and about 1.8–2.0% (wt) oxygen. The powder additive included about 100–120 kg ferrosilicon per ton of hot briquetted iron and about 135–150 kg fly ash per ton of hot briquetted iron. The ash contained 48% vanadium oxide as $V_2O_3$ and $V_2O_5$ and 12% nickel oxide. The iron and additive were mixed to provide a molar ratio of metallized iron to nickel and vanadium oxides of between about 1.59 and about 2.66. At a process temperature of about 560° C., the metallization of the original hot metallized iron particulate material increased by between about 2 and about 3.5 percentage points before melting by reacting with carbon, and nickel and vanadium were present in the final product.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

We claim:

1. A method for making iron-alloy briquettes, comprising the steps of:
   providing hot metallized iron particles having a temperature of at least about 650° C. and an initial degree of metallization of at least about 90% (wt.);
   providing an additive selected from the group consisting of ferroalloy powder, metal-containing ash and mixtures thereof, wherein said additive contains an alloying metal;
   mixing said iron particles and said additive to provide a mixture of said particles and said additive; and
   forming said mixture into briquettes containing said alloying metal.

2. A method according to claim 1, wherein said additive further contains a reducing metal, wherein said mixing step reacts said reducing metal with said particles so as to further reduce said metallized iron particles to a further degree of metallization greater than said initial degree of metallization.

3. A method according to claim 2, wherein said mixing step is carried out so as to provide a molar ratio of metallized iron in said metallized iron particles to said alloying metal and said reducing metal in said additive of between about 1 and about 3.

4. A method according to claim 1, wherein said additive is a particulate material having a particle size of between about 5 microns and about 250 microns.

5. A method according to claim 2, wherein said ferroalloy powder contains at least one element selected from the group consisting of chromium, nickel, vanadium, manganese, silicon, niobium and mixtures thereof.

6. A method according to claim 2, wherein said metal-containing ash contains said alloying metal.

7. A method according to claim 6, wherein said alloying metal is selected from the group consisting of titanium, cobalt, vanadium, chromium, niobium, manganese, nickel and mixtures thereof.

8. A method according to claim 2, wherein said metal-containing ash comprises between about 11% (wt) and about 48% (wt) vanadium oxide and between about 12% (wt) and about 44% (wt) nickel oxide.

9. A method according to claim 2, wherein said ferroalloy powder comprises ferrosilicon, and wherein said metal-containing ash comprises ash containing vanadium oxide and nickel oxide.

10. A method according to claim 1, wherein said additive includes said metal-containing ash, and said ash is a waste product obtained from a separate process.

11. A method according to claim 10, wherein said separate process is a hydrocarbon combustion process.

12. A method according to claim 1, wherein said step of providing said hot metallized iron particles comprises feeding iron oxide to a reducing vessel, and contacting said iron oxide in said reducing vessel with a reducing gas so as to produce said hot metallized iron particles having said initial degree of metallization.

13. A method according to claim 12, wherein said vessel is selected from the group consisting of bubbling bed reactors, spouted bed reactors, circulating fluidized bed reactors batch furnaces and shaft furnaces.

14. A method according to claim 12, wherein said mixing step is carried out in said vessel.

15. A method according to claim 1, wherein said additive includes said ferroalloy powder containing a reducing metal, and wherein said mixing step causes said reducing metal to react with oxygen in said hot metallized iron particles so as to form reducing metal oxides.

16. A method according to claim 15, wherein formation of said reducing metal oxides provides heat thereby reducing energy requirements for subsequent melting processes.

17. A method according to claim 1, wherein said hot metallized iron particles contain about 2% (wt) of carbon.

18. A method according to claim 1, wherein said hot metallized iron particles and said additive are mixed at a temperature of between about 700° C. and about 800° C.

19. A method according to claim 1, wherein said hot metallized iron particles and said additive are mixed at a temperature of between about 740° C. and about 790° C.

20. A method according to claim 1, wherein said forming step is carried out at a temperature of between about 650° C. and about 740° C.

21. A method according to claim 1, wherein said forming step is carried out at a temperature of between about 670° C. and about 720° C.

* * * * *